(12) United States Patent
Webb et al.

(10) Patent No.: US 10,702,749 B2
(45) Date of Patent: *Jul. 7, 2020

(54) MULTIPLE MATERIAL GOLF CLUB HEAD WITH CROWN SCARF JOINT

(71) Applicant: Callaway Golf Company, Carlsbad, CA (US)

(72) Inventors: Brian Webb, Hemet, CA (US); Brandon D. DeMille, Carlsbad, CA (US); Dominic LeBlanc, Encinitas, CA (US); Patrick Dawson, San Diego, CA (US); William C. Watson, Temecula, CA (US); Bradley C. Rice, Carlsbad, CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/401,829

(22) Filed: May 2, 2019

(65) Prior Publication Data

US 2019/0255398 A1    Aug. 22, 2019

Related U.S. Application Data

(63) Continuation of application No. 15/613,764, filed on Jun. 5, 2017, now Pat. No. 10,279,224, which is a
(Continued)

(51) Int. Cl.
| | |
|---|---|
| *B29C 65/48* | (2006.01) |
| *A63B 53/04* | (2015.01) |
| *B29C 65/00* | (2006.01) |
| *A63B 1/00* | (2006.01) |
| *B29K 307/04* | (2006.01) |

(Continued)

(52) U.S. Cl.
CPC ............ *A63B 53/0466* (2013.01); *A63B 1/00* (2013.01); *B29C 65/48* (2013.01); *B29C 66/131* (2013.01); *B29C 66/7212* (2013.01); *B29C 66/742* (2013.01); *A63B 2053/0437* (2013.01); *A63B 2209/00* (2013.01); *B29K 2307/04* (2013.01);
(Continued)

(58) Field of Classification Search
None
See application file for complete search history.

(56) References Cited

U.S. PATENT DOCUMENTS 10,279,224 B1 *   5/2019  Webb ...................... A63B 1/00

* cited by examiner

*Primary Examiner* — Jeffry H Aftergut
(74) *Attorney, Agent, or Firm* — Rebecca Hanovice; Michael Catania; Sonia Lari (57) ABSTRACT

A multiple-material golf club head with an improved scarf joint between the crown and the body, and a method of finishing said golf club head is disclosed herein. The golf club preferably has a metal body comprising a striking face, a sole, a return portion, a bond flange, and a rear flange, and a composite crown having a scarf region, a step portion, and a constant thickness region directly behind the scarf region. The golf club is manufactured by providing a club head with a bond flange, providing a composite crown with a scarf region delineated by a front edge and a step portion and/or groove, bonding the scarf region to the bond flange to form an upper golf club head surface, and grinding the upper golf club head surface only from a location proximate the front edge to a location proximate the step portion and/or groove.

20 Claims, 6 Drawing Sheets

Related U.S. Application Data continuation-in-part of application No. 15/062,698, filed on Mar. 7, 2016, now Pat. No. 9,682,295.

(60) Provisional application No. 62/280,077, filed on Jan. 18, 2016.

(51) Int. Cl.
*B29K 705/00* (2006.01)
*B29L 31/52* (2006.01)

(52) U.S. Cl.
CPC ... *B29K 2705/00* (2013.01); *B29L 2031/5227* (2013.01)

MULTIPLE MATERIAL GOLF CLUB HEAD WITH CROWN SCARF JOINT

CROSS REFERENCES TO RELATED APPLICATIONS

The present application is a continuation of U.S. patent application Ser. No. 15/613,764, filed on Jun. 5, 2017, and issued on May 7, 2018, as U.S. Pat. No. 10,279,224, which is a continuation-in-part of U.S. patent application Ser. No. 15/062,698, filed on Mar. 7, 2016, and issued on Jun. 20, 2017, as U.S. Pat. No. 9,682,295, which claims priority to U.S. Provisional Patent Application No. 62/280,077, filed on Jan. 18, 2016, the disclosure of each of which is hereby incorporated by reference in its entirety herein.

STATEMENT REGARDING FEDERALLY SPONSORED RESEARCH OR DEVELOPMENT

Not Applicable

BACKGROUND OF THE INVENTION

Field of the Invention

The present invention relates to a method of manufacturing a golf club head having a composite crown with a scarf joint attachment region. More specifically, the method involves providing a stepped, scarf-jointed crown portion that minimizes the area of the composite crown that is sanded or ground down during the post-attachment finishing process.

Description of the Related Art

Figure 1:
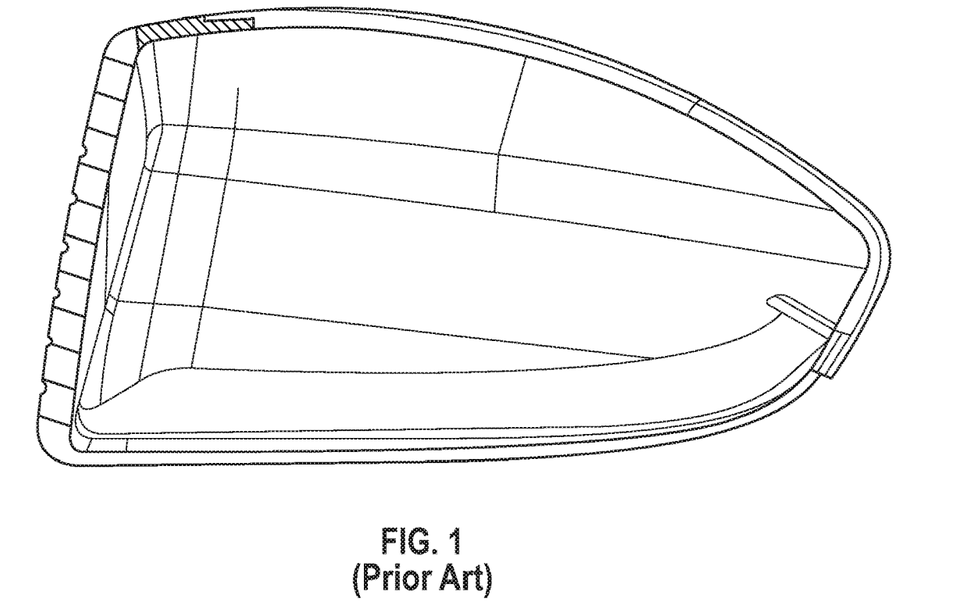
FIG. 1 is a cross-sectional view of a prior art golf club head.
Figure 2:
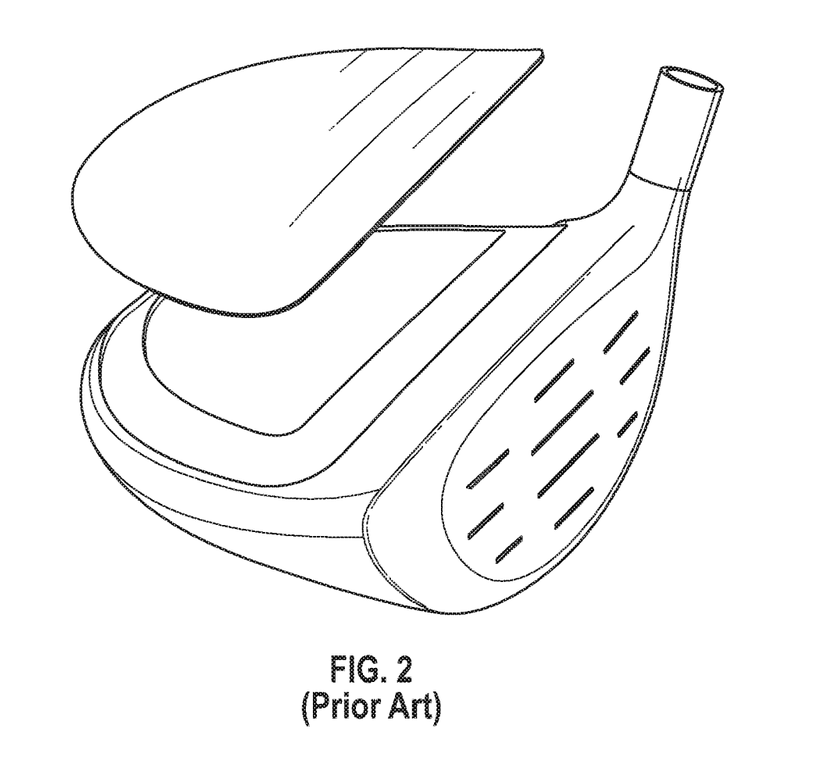
FIG. 2 is an exploded view of a prior art golf club head.
Figure 3:
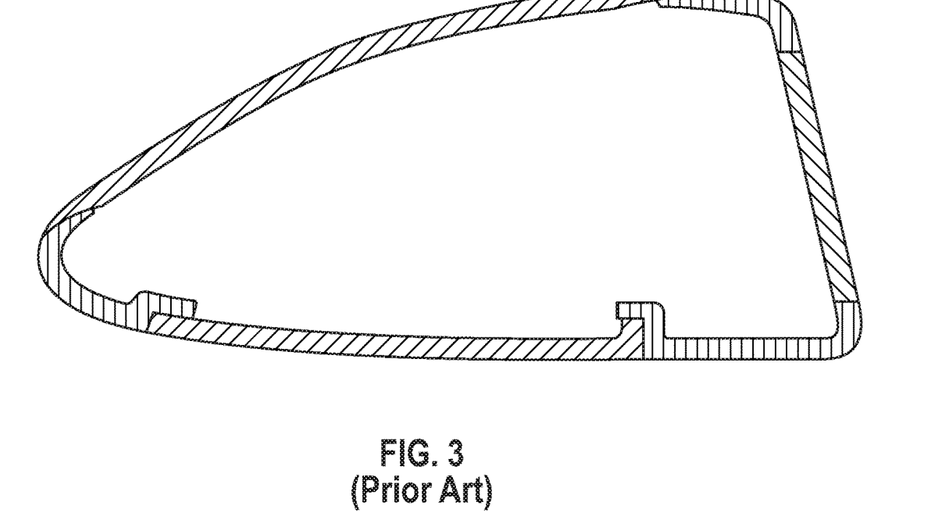
FIG. 3 is a cross-sectional view of a prior art golf club head.
Figure 4:
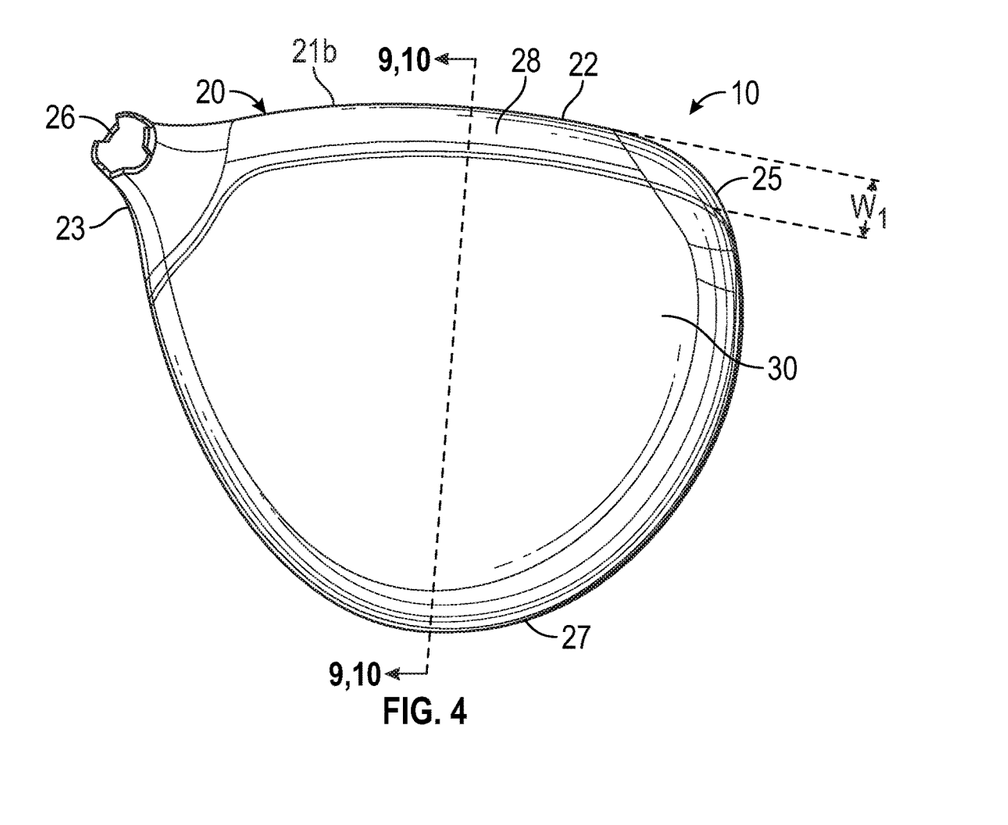
FIG. 4 is a top elevational view of a golf club head according to the present invention.

Golf club manufacturers often combine metallic golf club head bodies with composite crowns to reduce the overall head mass and lower the clubs' center of gravity, thus improving the mass properties of such multiple material heads. The region where the crown is affixed to the body with an adhesive material is typically known as the bond joint. In prior art multiple material golf club heads, manufacturers often employ a lap joint, or "step" structure, examples of which are shown in FIGS. 1 (disclosed in U.S. Pat. No. 6,623,378) and 2 (disclosed in U.S. Pat. No. 6,969,326), at the intersection between the crown and the body. This "step"-type prior art structure, though relatively straightforward to manufacture, is problematic because it creates a high-stress area at the front of the bond joint, which means that a great deal of stress is placed on the adhesive when the golf club head impacts a golf ball. This causes the crown to separate from the body at the bond region, which becomes visible to a golfer after repeated use and often leads to permanent damage to the club. The prior art discloses other types of bond region structures, including a basic scarf joint shown in FIG. 3 (disclosed in U.S. Patent Application Publication Number 2015/0045134), but this structure is not optimized to address the significant stresses placed on the bond region and other parts of the golf club head when the head repeatedly impacts golf balls.

The manner in which these prior art composite crown structures are processed during post-attachment finishing steps is also not ideal, as a large region of the crown (known as grindstock or polishing stock) is sanded down to achieve a smooth, fully finished upper surface and eliminate imperfections in the body, requiring additional time, steps, and materials (including multiple sanding belts) and reducing the overall cosmetic appeal of the crown. In the event that the crown incorporates a fabric with a weave pattern, that pattern is obscured from view by finishing steps, thus reducing the aesthetic appeal of the golf club head.

Therefore, there is a need for an improved bond region structure that minimizes the significant stresses of impact that cause separation of the crown from the body, and that can be manufactured efficiently and finished in a manner that does not reduce its cosmetic appeal.

BRIEF SUMMARY OF THE INVENTION

One aspect of the present invention is a method of manufacturing a golf club head comprising a composite crown having a tapered, full, or partial scarf joint attachment region so that the cosmetic features (e.g., the weave pattern) of the composite are retained and not sanded down and obscured during finishing.

Another aspect of the present invention is a method comprising the steps of providing a hollow golf club head body comprising a striking face, a face extension extending from an upper edge of the striking face, a bond flange extending from the face extension, a sole extending from a lower edge of the striking face, a rear flange extending away from the sole, and an upper opening, providing a composite crown comprising a scarf region with a front edge having a first thickness, a step portion having a second thickness, and a rear region having a third thickness, the scarf region gradually increasing in thickness from the front edge to the step portion, bonding the scarf region to the bond flange and the rear region to the rear flange to form an upper golf club head surface, and grinding the upper golf club head surface only from a location proximate the front edge to a location proximate the step portion, wherein the second thickness is greater than the first thickness, wherein the second thickness is greater than the third thickness, and wherein the step portion separates the scarf region from the rear region.

In some embodiments, no portion of the rear region may subject to the grinding step. In a further embodiment, the rear region may constitute a majority of an area of the crown. In other embodiments, the grinding step may reduce the thickness of the step portion from the second thickness to a fourth thickness, and the fourth thickness may be greater than the third thickness. In a further embodiment, a difference between the second thickness and the third thickness may be 0.010 inch to 0.050 inch, and a difference between the fourth thickness and the third thickness may be 0.005 inch to 0.030 inch. In another embodiment, the scarf region may have a front-to-back width of 0.250 inch to 1.250 inch. In yet another embodiment, the first thickness may be less than 0.060 inch, the second thickness may be 0.025 inch to 0.110 inch, and the third thickness may be 0.015 inch to 0.060 inch. In still other embodiments, at least a portion of the bond flange may not comprise any convex or concave curvature, while the rear flange may comprise a convex curvature.

Yet another aspect of the present invention is a method comprising the steps of providing a golf club body comprising a striking face, a face extension extending from an upper edge of the striking face, a sole extending from a lower edge of the striking face, and a bond flange extending from the face extension, providing a carbon composite crown comprising a front edge, a scarf region, a rear region, and a groove extending approximately parallel with the front edge and separating the scarf region from the rear region, bonding the scarf region to the bond flange to form an upper golf club head surface, and grinding the upper golf club head surface only from a location proximate the front edge to a location proximate the groove, wherein no portion of the rear region is subject to the grinding step, wherein the groove has a depth of 0.010 inch to 0.100 inch, and wherein the scarf region has a front-to-back width of 0.250 inch to 1.250 inch.

In some embodiments, at least a portion of the bond flange may not comprise any convex or concave curvature. In other embodiments, the bond flange may have a maximum front-to-back width of no less than 0.100 inch and no more than 0.400 inch, and in a further embodiment, the bond flange may have a constant width. In some embodiments, the scarf region may have an approximately triangular cross-sectional shape. In other embodiments, the groove may have a rounded cross-sectional shape. In any of the embodiments, the rear region may comprise a visible weave pattern.

Another aspect of the present invention is a method comprising the steps of casting from a metal material a hollow golf club head body comprising a striking face, a face extension extending from an upper edge of the striking face, a bond flange extending from the face extension, a sole extending from a lower edge of the striking face, a rear flange extending away from the sole at an angle of less than 90°, and an upper opening defined by the striking face, bond flange, rear flange, and sole, providing a crown comprising a multi-axial carbon composite fabric, the crown comprising a scarf region with a front edge having a first thickness of less than 0.050 inch, a step portion having a second thickness of 0.025 inch to 0.110 inch, and a rear region having a third thickness of 0.015 inch to 0.060 inch, applying a first adhesive layer to the bond flange and a second adhesive layer to the rear flange, affixing the scarf region to the first adhesive layer on the bond flange and the rear region to the second adhesive layer on the rear flange to cover the upper opening and form an upper golf club head surface, and grinding the upper golf club head surface only from a location proximate the front edge to a location proximate the step portion, wherein the step portion separates the scarf region from the rear region, wherein the scarf region has an approximately triangular cross-sectional shape, wherein no portion of the rear region is subject to the grinding step, and wherein the rear region comprises a visible weave pattern.

In some embodiments of this method, the grinding step may reduce the thickness of the step portion from the second thickness to a fourth thickness of 0.020 inch to 0.090 inch. In other embodiments, the crown may comprise a compression-molded composite material co-molded with the multi-axial carbon composite fabric. In still other embodiments, each of the first and second adhesive layers may have a thickness of no more than 0.010 inch. In any of the embodiments, the step portion may extend in a heel-to-toe direction across at least 50% of the crown.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

The present invention introduces a solution to the problems set forth above by providing a composite crown with an improved scarf joint construction in combination with a golf club head having improved support flanges, and methods of finishing said golf club heads to preserve the cosmetic appeal of the composite crown.

A preferred embodiment of the present invention is shown in FIGS. 4-10. In this embodiment, the golf club head 10 comprises a body 20 having a striking face 22, a heel 23, a sole 24 extending rearwards from a lower edge 21a of the striking face 22, a toe 25, a hosel 26, a rear side 27, a face extension 28 extending rearwards away from an upper edge 21b of the striking face 22, a bond flange 40 extending rearwards away from the face extension 28, and a rear flange 50 extending away from the rear side 27 of the sole 24 towards the striking face 22 at an angle α that is preferably less than 90°. The bond flange 40 extends away from the face extension 28 and jogs around the hosel 26 at the heel 23 to connect with the rear flange 50, which extends off of the sole 24. The bond flange 40 and rear flange 50 define an upper opening in the body 20.

Figure 5:
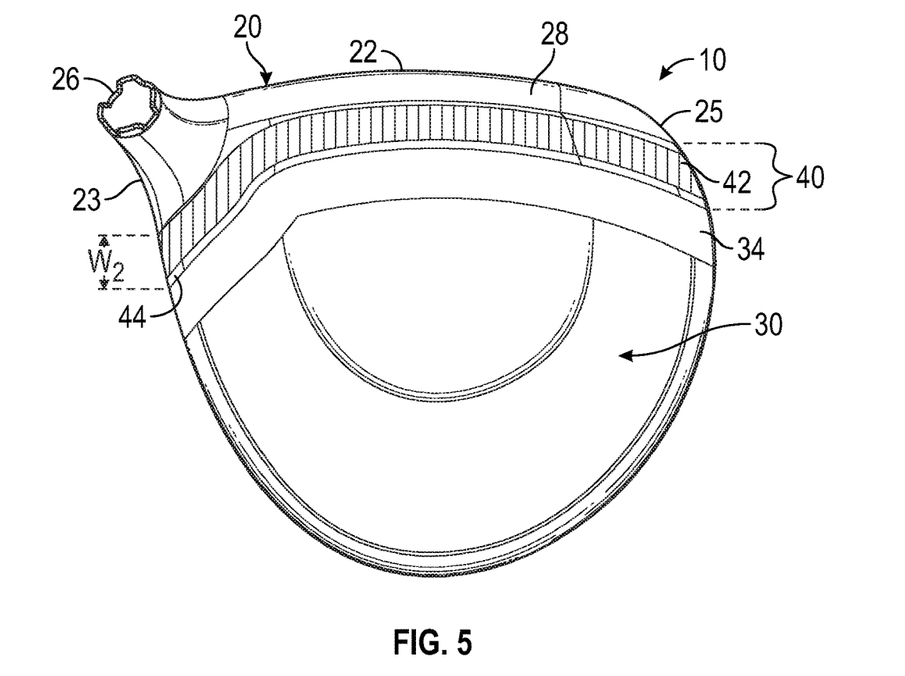
FIG. 5 is a top elevational view of the golf club head shown in FIG. 4 with a front region of the bond flange highlighted.
Figure 6:
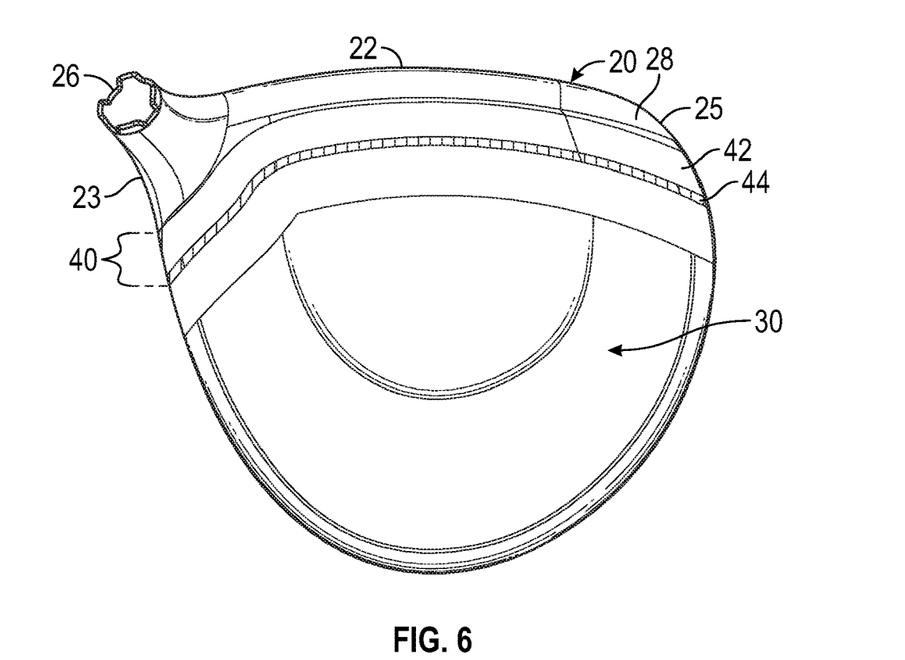
FIG. 6 is a top elevational view of the golf club head shown in FIG. 4 with a rear region of the bond flange highlighted.
Figure 7:
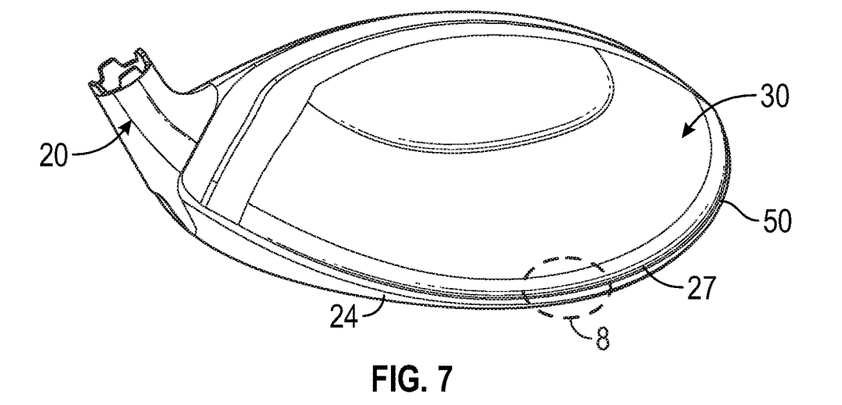
FIG. 7 is a rear perspective view of the golf club head shown in FIG. 4.
Figure 8:
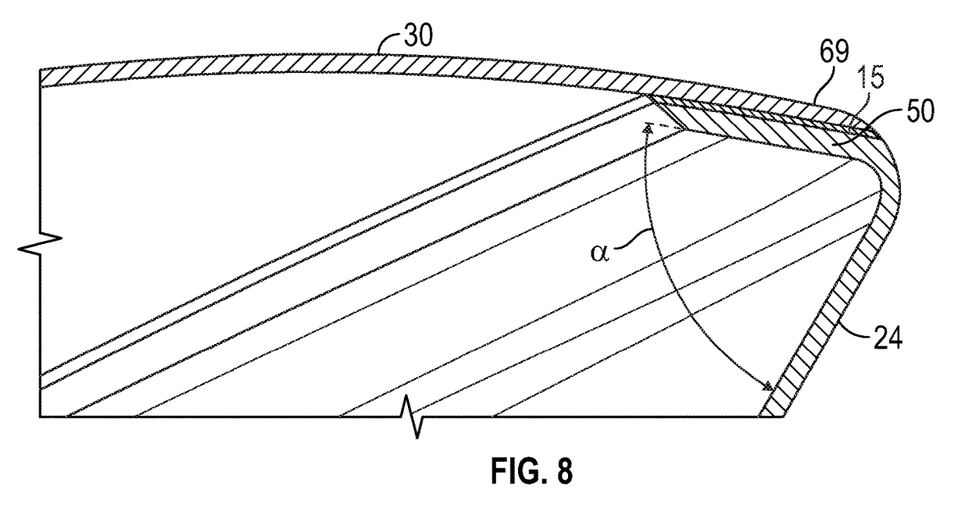
FIG. 8 is an enlarged, cross-sectional view of the circled portion of golf club head shown in FIG. 7.

The face extension 28 preferably has a front-to-back width $W_1$ of at least 0.200 inch, and more preferably approximately 0.400 inch. The bond flange 40 may have a variable front-to-back width, but preferably has a constant front-to-back width $W_2$ that ranges from 0.100-0.400 inch, and more preferably is approximately 0.300 inch. It is important that the bond flange 40 have no convex or concave curvature to avoid introducing weak points into the bond between the bond flange 40 and the crown 30 when the golf club head 10 is fully assembled. As shown in FIGS. 5 and 6, the bond flange 40 has a front region 42 and a back region 44. The front region 42 preferably has an approximately constant thickness $T_1$, while the back region 44 preferably has a greater thickness $T_2$ than the front region 42 to provide additional support to the crown 30 where it contacts the body 20.

Figure 12:
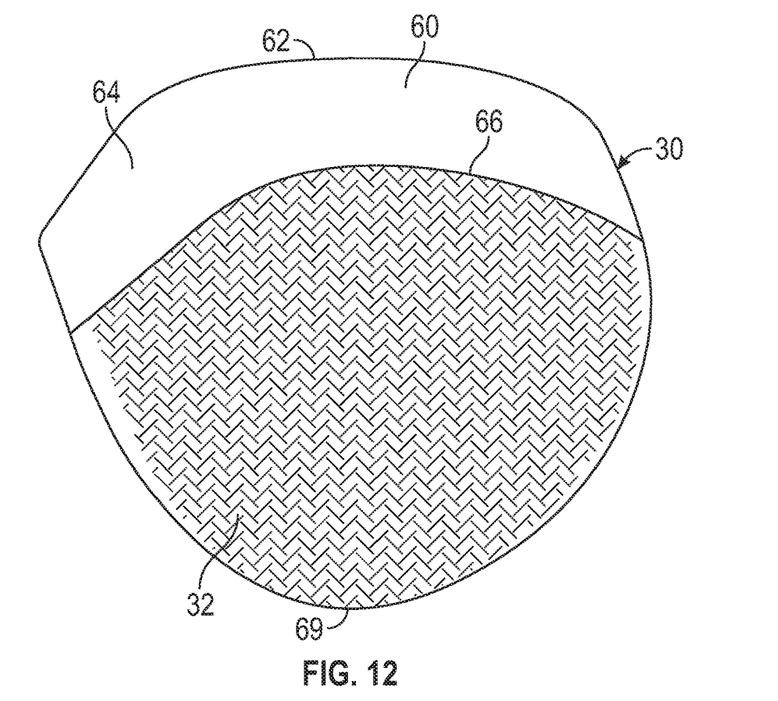
FIG. 12 is a top perspective view of an exemplary crown of the present invention.

The golf club head 10 also comprises a crown 30 that is permanently bonded to the body 20 with an adhesive to close the upper opening and preferably is at least partially composed of a material with a weave pattern 32, an example of which is shown in FIG. 12. The weave pattern 32 may be achieved by using a multi-axial carbon composite fabric, examples of which are disclosed in U.S. patent application Ser. No. 15/213,204, the disclosure of which is hereby incorporated by reference in its entirety herein. The crown may also include SMC, prepreg plies, or any of the compositions disclosed in U.S. Pat. No. 9,033,822, the disclosure of which is incorporated by reference in its entirety herein. The crown 30 is permanently bonded to the body 20 with an adhesive to close the upper opening. The adhesive 15, which is applied to upper surfaces of the bond flange 40 and the rear flange 50, should have a thickness of no more than 0.010 inch.

Figure 9:
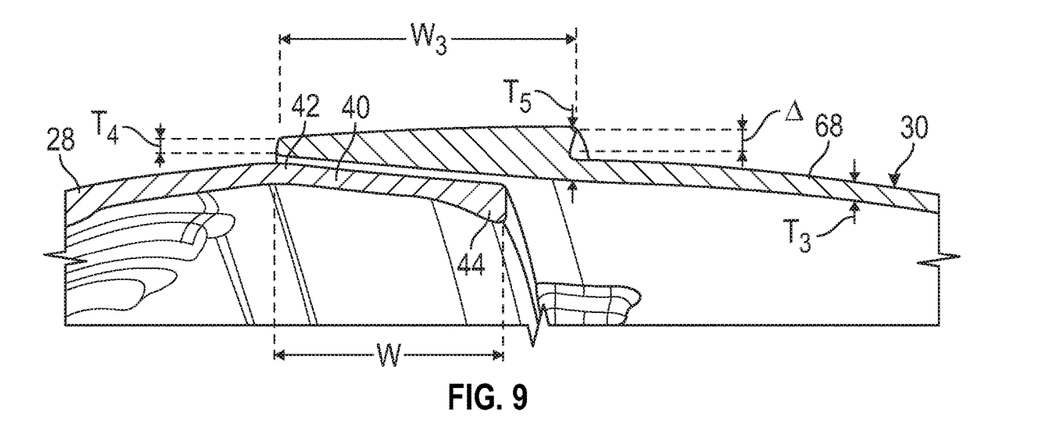
FIG. 9 is a cross-sectional view of the golf club head shown in FIG. 4 along lines 9-9.
Figure 10:
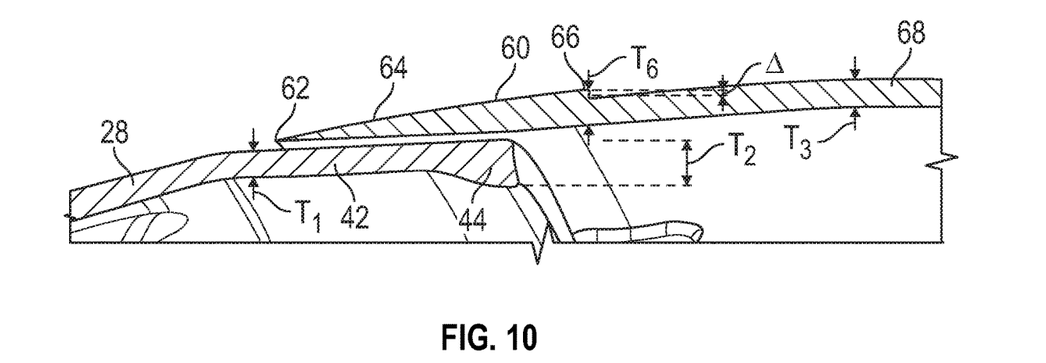
FIG. 10 is a cross-sectional view of the golf club head shown in FIG. 4 along lines 9-9 after finishing processes have been performed.

As shown in FIGS. 9 and 10, the crown 30 includes a tapered scarf region 60, which includes a front edge 62 where the crown 30 ends, a transition region 64 where the crown thickness gradually increases, a step portion 66 where the thickness abruptly decreases, and a rear region 68 with an approximately constant thickness extending from the step portion 66 to the edge 69 of the crown 30. The transition region 64 preferably has a front-to-back width $W_3$ that is at least slightly greater than the front-to-back width $W_2$ of the bond flange 40, and more preferably approximately 0.25-0.25 inch, and has an approximately triangular cross-sectional shape along a front-to-back plane extending perpendicular to the front edge 62. The rear region 68 constitutes the remaining area of the crown 30, and preferably a majority of the area of the crown 30, and preferably has a variable thickness $T_3$ that stays within the range of 0.015-0.060 inch, though the rear region 68 may have one or more areas of constant thickness within that thickness range. The edge 69 of the rear region 68 intersects with the rear flange 50 of the body 20, which may have a convex curvature to match the curvature of the crown 30.

Figure 11:
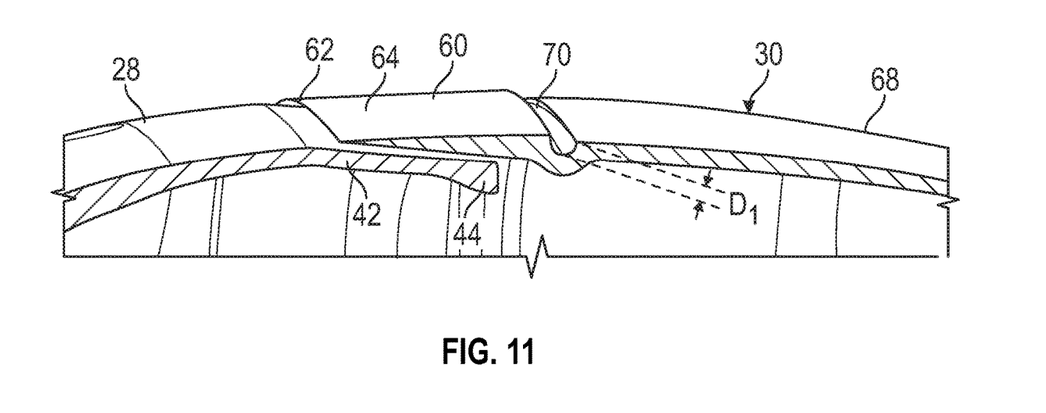
FIG. 11 is a cross-sectional view of an alternative golf club head of the present invention.

The dimensions of the scarf region 60 of the crown 30 before the golf club head 10 is subjected to finishing processes (e.g., sanding or polishing) are different from the dimensions of the scarf region 60 after finishing. The manufactured crown 30 has a front edge thickness $T_4$ of less than 0.060 inch, more preferably less than 0.050 inch, and a step portion 66 thickness $T_5$ of 0.02-0.110 inch, but after the crown 30 is bonded to the body 20, the front edge 62, transition region 64, and step portion 66 are ground down during finishing such that the thickness of the front edge 62 is reduced to a sharp edge and the of the step portion 66 is reduced by 0.005-0.020 inch to have a thickness $T_6$ of 0.020-0.090 inch. In any event, the difference A between the step portion 66 thickness and the rear region 68 thickness $T_3$ drops from 0.010-0.050 inch to 0.005-0.030 inch due to finishing. In an alternative embodiment, shown in FIG. 11 the step portion 66 may be replaced with a groove 70 or accent, which may have a rounded or curved cross-sectional shape. In yet another embodiment, the crown 30 may include both the step portion 66 and the groove 70 to even more clearly delineate the scarf region 60; this groove 70 preferably has a depth $D_1$ of 0.010-0.100 inch.

The step portion 66 (and/or groove 70), which preferably extends across more than 50% of the entire heel-to-toe length of the crown 30 approximately parallel with the front edge 62, and more preferably across the entire length of the crown 30 as shown in FIG. 12, acts as a boundary for the region of the crown 30 subjected to finishing processes. In other words, the sacrificial area of the crown 30 that is sanded down during finishing is limited to the scarf region 60, thus preserving the visibility of the weave pattern 32 of the rear region 68 of the crown 30, as shown in FIG. 12.

Figure 13:
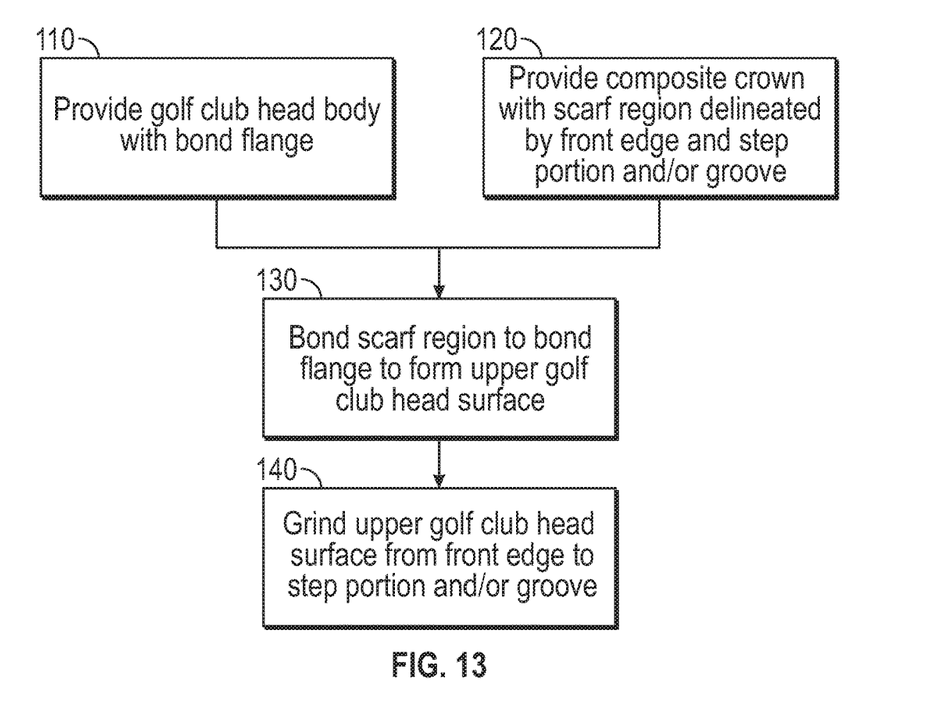
FIG. 13 is a flow chart describing a preferred method of manufacturing a golf club head according to the present invention.

A preferred method of the present invention is illustrated in FIG. 13. The method includes the steps of providing a golf club head body having a bond flange 110, providing a composite crown with a scarf region delineated by a front edge and a step portion and/or groove 120, bonding the scarf region to the bond flange to form an upper golf club head surface 130, and grinding the upper golf club head surface from the front edge to the step portion and/or groove 140 to finish the club head 10 and preserve the cosmetic features of a majority of the crown 30. The grinding step 140 preferably does not apply any finishing processes to the rear region 68 of the crown 30 so that its weave pattern is visible to a golfer during use. The preferred method may include an intermediate step of applying an adhesive layer to the bond flange prior to attaching the crown to the head body.

The golf club head 10 of the present invention may be constructed to take various shapes, including traditional, square, rectangular, or triangular. In some embodiments, the golf club head 10 of the present invention may take shapes such as those disclosed in U.S. Pat. Nos. 7,163,468, 7,166,038, 7,169,060, 7,278,927, 7,291,075, 7,306,527, 7,311,613, 7,390,269, 7,407,448, 7,410,428, 7,413,520, 7,413,519, 7,419,440, 7,455,598, 7,476,161, 7,494,424, 7,578,751, 7,588,501, 7,591,737, and 7,749,096, the disclosure of each of which is incorporated by reference in its entirety herein.

The golf club head 10 of the present invention may also have a variable thickness striking face 22, such as the thickness patterns disclosed in U.S. Pat. Nos. 5,163,682, 5,318,300, 5,474,296, 5,830,084, 5,971,868, 6,007,432, 6,338,683, 6,354,962, 6,368,234, 6,398,666, 6,413,169, 6,428,426, 6,435,977, 6,623,377, 6,997,821, 7,014,570, 7,101,289, 7,137,907, 7,144,334, 7,258,626, 7,422,528, 7,448,960, 7,713,140, 8,012,041, 8,696,489, and 9,101,809, the disclosure of each of which is incorporated by reference in its entirety herein.

The mass of the club head 10 of the present invention ranges from 165 grams to 250 grams, preferably ranges from 175 grams to 230 grams, and most preferably from 190 grams to 205 grams. The crown 30 has a mass preferably ranging from 4 grams to 30 grams, more preferably from 15 grams to 25 grams, and most preferably 20 grams.

The golf club head 10 of the present invention preferably has a volume that ranges from 290 cubic centimeters to 600 cubic centimeters, and more preferably ranges from 330 cubic centimeters to 510 cubic centimeters, even more preferably 350 cubic centimeters to 495 cubic centimeters, and most preferably 415 cubic centimeters or 470 cubic centimeters.

The center of gravity and the moment of inertia of a golf club head 10 of the present invention are preferably measured using a test frame ($X^T$, $Y^T$, $Z^T$), and then transformed to a head frame ($X^H$, $Y^H$, $Z^H$). The center of gravity of a golf club head may be obtained using a center of gravity table having two weight scales thereon, as disclosed in U.S. Pat. No. 6,607,452, entitled *High Moment Of Inertia Composite Golf Club*, and hereby incorporated by reference in its entirety.

The moment of inertia, Izz, about the Z axis for the golf club head 10 of the present invention preferably ranges from 2800 g-cm$^2$ to 6000 g-cm$^2$, preferably from 3000 g-cm$^2$ to 600 g-cm$^2$, and most preferably from 5000 g-cm$^2$ to 6000 g-cm$^2$. The moment of inertia, Iyy, about the Y axis for the golf club head 10 preferably ranges from 1500 g-cm$^2$ to 5000 g-cm$^2$, preferably from 2000 g-cm$^2$ to 5000 g-cm$^2$, and most preferably from 3000 g-cm$^2$ to 4500 g-cm$^2$. The moment of inertia, Ixx, about the X axis for the golf club head 10 preferably ranges from 1500 g-cm² to 4000 g-cm², preferably from 2000 g-cm² to 3500 g-cm², and most preferably from 2500 g-cm² to 3000 g-cm².

The golf club heads 10 of the present invention preferably have coefficient of restitutions ("COR") ranging from 0.81 to 0.875, and more preferably from 0.82 to 0.84. The golf club heads 10 preferably have characteristic times ("CT") as measured under USGA conditions of 256 microseconds.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. The section titles included herein also are not intended to be limiting. Therefore, the embodiments of the invention in which an exclusive property or privilege is claimed are defined in the following appended claims.

We claim:

1. A method comprising the steps of:
providing a golf club head body comprising a striking face, a face extension extending from an upper edge of the striking face, a bond flange extending from the face extension, and a sole extending from a lower edge of the striking face;
providing a crown comprising a scarf region with a front edge having a first thickness, a step portion having a second thickness that is greater than the first thickness, and a rear region having a third thickness, the scarf region gradually increasing in thickness from the front edge to the step portion;
affixing the scarf region to the bond flange to form an upper golf club head surface; and
grinding the upper golf club head surface only from a location proximate the front edge to a location proximate the step portion,
wherein the step portion separates the scarf region from the rear region, and
wherein no portion of the rear region is subject to the grinding step.

2. The method of claim 1, wherein the rear region constitutes a majority of an area of the crown.

3. The method of claim 1, wherein the second thickness is greater than the third thickness.

4. The method of claim 1, wherein the grinding step reduces the thickness of the step portion from the second thickness to a fourth thickness, and wherein the fourth thickness is greater than the third thickness.

5. The method of claim 4, wherein a difference between the second thickness and the third thickness is 0.010 inch to 0.050 inch, and wherein a difference between the fourth thickness and the third thickness is 0.005 inch to 0.030 inch.

6. The method of claim 1, wherein the scarf region has a front-to-back width of 0.250 inch to 1.250 inch.

7. The method of claim 1, wherein the first thickness is less than 0.060 inch, wherein the second thickness is 0.025 inch to 0.110 inch, and wherein the third thickness is 0.015 inch to 0.060 inch.

8. The method of claim 1, wherein at least a portion of the bond flange does not comprise any convex or concave curvature.

9. The method of claim 1, further comprising the step of affixing the rear region of the crown to a rear flange of the body, wherein the rear flange extends away from the sole at an angle of less than 90°, and wherein the rear flange comprises a convex curvature.

10. The method of claim 1, wherein the step portion extends in a heel-to-toe direction across at least 50% of the crown.

11. A method comprising the steps of:
providing a metal golf club body comprising a striking face, a face extension extending from an upper edge of the striking face, a sole extending from a lower edge of the striking face, and a bond flange extending from the face extension;
providing a composite crown comprising a front edge, a scarf region, a rear region, and a groove extending approximately parallel with the front edge and separating the scarf region from the rear region;
affixing the scarf region to the bond flange to form an upper golf club head surface; and
grinding the upper golf club head surface only from a location proximate the front edge to a location proximate the groove,
wherein no portion of the rear region is subject to the grinding step, and
wherein at least a portion of the bond flange does not comprise any convex or concave curvature.

12. The method of claim 11, wherein the groove has a depth of 0.010 inch to 0.030 inch.

13. The method of claim 11, wherein the scarf region has a front-to-back width of 0.250 inch to 1.250 inch.

14. The method of claim 11, wherein the bond flange has a maximum front-to-back width of no less than 0.100 inch and no more than 0.400 inch.

15. The method of claim 14, wherein the bond flange has a constant width.

16. The method of claim 11, wherein the scarf region has an approximately triangular cross-sectional shape.

17. The method of claim 11, wherein the groove has a rounded cross-sectional shape.

18. The method of claim 11, wherein the rear region comprises a visible weave pattern.

19. The method of claim 11, further comprising the step of affixing the rear region of the crown to a rear flange of the body, wherein the rear flange extends away from the sole, and wherein the rear flange comprises a convex curvature.

20. The method of claim 19, wherein the rear flange extends away from the sole at an angle of less than 90°.

* * * * *